(12) United States Patent
Nakano

(10) Patent No.: US 6,486,869 B1
(45) Date of Patent: Nov. 26, 2002

(54) CURSOR CONTROL METHOD, RECORDING MEDIUM AND INFORMATION PROCESSING APPARATUS

(75) Inventor: Ichiro Nakano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/271,250

(22) Filed: Mar. 17, 1999

(30) Foreign Application Priority Data

Jul. 1, 1998 (JP) .......................................... 10-186344

(51) Int. Cl.⁷ ................................................ G09G 5/08
(52) U.S. Cl. ...................... 345/157; 345/156; 345/161; 345/158; 345/159; 345/160; 345/162; 345/163; 345/164; 345/165; 345/166; 345/167; 345/626; 345/504
(58) Field of Search ................................. 345/158, 156, 345/157, 161–167, 160, 159, 509, 587, 626

(56) References Cited

U.S. PATENT DOCUMENTS

| | | | |
|---|---|---|---|
| 5,664,161 A | * | 9/1997 | Fukushima et al. .......... 345/501 |
| 5,815,138 A | * | 9/1998 | Tsubaki et al. .............. 345/157 |
| 5,900,872 A | * | 5/1999 | Ashe ........................... 345/157 |
| 6,031,531 A | * | 2/2000 | Kimble ........................ 345/157 |

* cited by examiner

*Primary Examiner*—Richard Hjerpe
*Assistant Examiner*—Ali Zamani
(74) *Attorney, Agent, or Firm*—Staas & Halsey LLP

(57) ABSTRACT

A cursor control method, and an apparatus and a memory medium which stores a program related thereto controls a position of a cursor displayed on a screen based on an input from a pointing device. The cursor control method includes the steps of detecting a present position of the cursor based on the input from the pointing device, and (b) controlling a moving quantity of the cursor on the screen based on the input from the pointing device depending on mask information which indicates a specific region on the screen and the present position of the cursor.

18 Claims, 11 Drawing Sheets

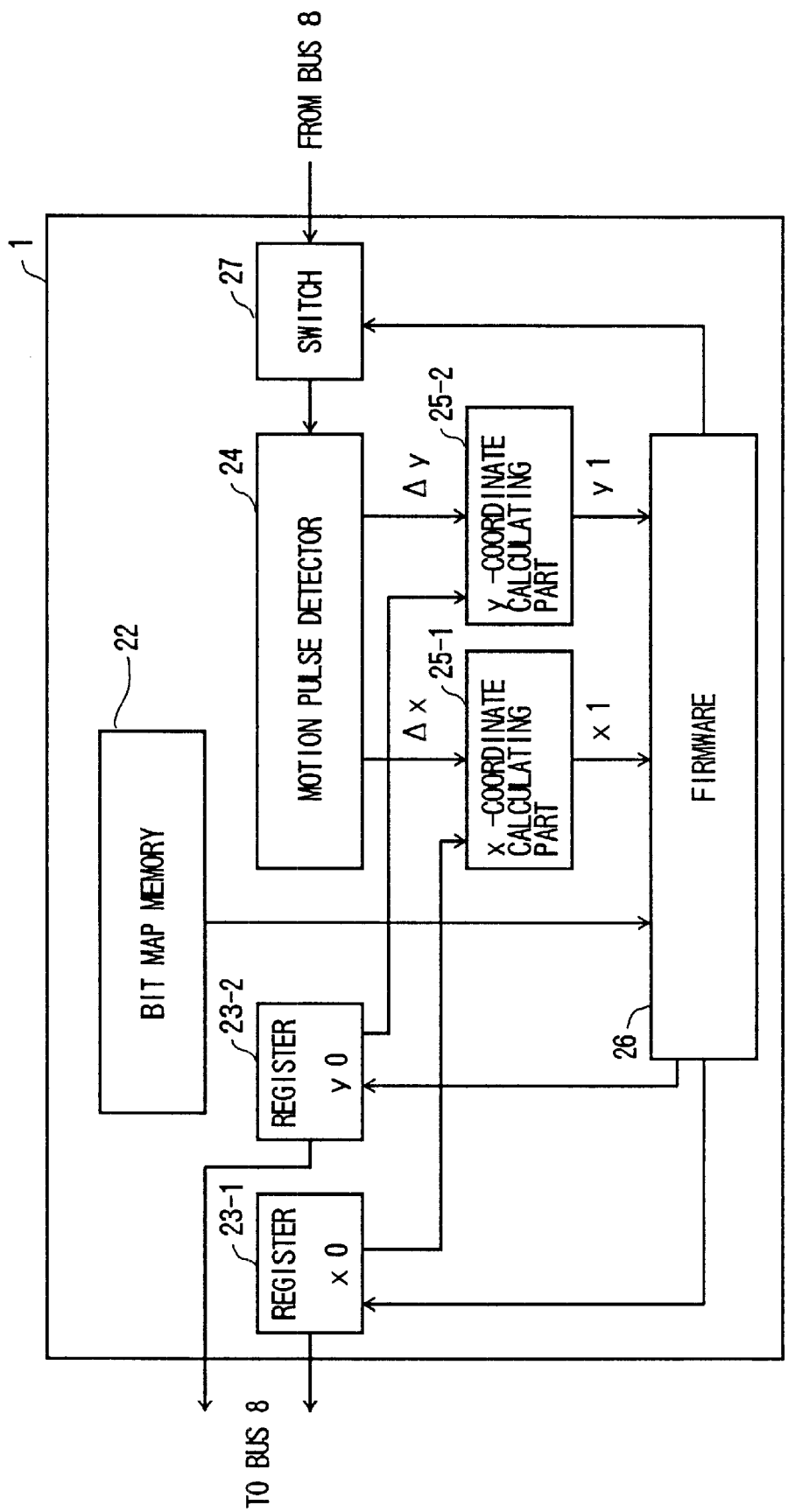
F I G. 5

CURSOR CONTROL METHOD, RECORDING MEDIUM AND INFORMATION PROCESSING APPARATUS

BACKGROUND OF THE INVENTION

1. Field of the Invention

The present invention generally relates to cursor control methods, recording mediums and information processing apparatuses, and more particularly to a cursor control method for controlling a position of a cursor displayed on a screen of a display unit based on an input from a pointing device in an information processing apparatus such as a personal computer and a work station, a computer-readable recording medium which stores a program for causing a computer to control the position of the cursor, and an information processing apparatus which uses such a cursor control method.

2. Description of the Related Art

Recently, most display units used in information processing apparatuses such as a personal computer and a work station employ a graphical interface. When a user makes some kind of instruction with respect to the information processing apparatus, there are more and more situations for the user to control the cursor movements on the screen using a pointing device such as a joy-stick and a track-ball, in addition to using a keyboard. The cursor which is displayed on the screen based on an input from the pointing device is also referred to as a "mouse cursor", so as to distinguish the cursor which is displayed on the screen based on the input from the pointing device from the cursor which is displayed on the screen based on the input from the keyboard.

In the case of a desk-top type information processing apparatus, a mouse is normally used as the pointing device because a relatively large work area can be used to operate the mouse. On the other hand, in the case of a portable information processing apparatus such as a notebook type or laptop type personal computer, a joy-stick or a trackball is normally used as the pointing device.

The pointing device, such as the joy-stick and the track-ball, is provided in a part of the keyboard, and the ease of operation in general is poor compared to the ease of operation of the mouse.

For this reason, there is a problem in that it is difficult to quickly and accurately move the cursor on the screen by operating the pointing device such as the joy-stick and the track-ball.

On the other hand, even in the case of the mouse, if the user is not a skilled person and is unfamiliar with the operation of the mouse, there is a problem in that it is difficult for such a user to quickly and accurately move the cursor on the screen by operating the mouse.

SUMMARY OF THE INVENTION

Accordingly, it is a general object of the present invention to provide a novel and useful cursor control method, computer-readable recording medium and information processing apparatus in which the problems described above are eliminated.

Another and more specific object of the present invention is to provide a cursor control method, a computer-readable recording medium and information processing apparatus which can quickly and accurately move a cursor on a screen by operating a pointing device, regardless of the kind of pointing device and the familiarity or skilled level of the user.

Still another object of the present invention is to provide a cursor control method for controlling a position of a cursor displayed on a screen based on an input from a pointing device, comprising the steps of (a) detecting a present position of the cursor based on the input from the pointing device, and (b) controlling a moving quantity of the cursor on the screen based on the input from the pointing device depending on mask information which indicates a specific region on the screen and the present position of the cursor. According to the cursor control method of the present invention, it is possible to quickly and accurately move the position of the cursor on the screen by operating the pointing device. In the cursor control method, the step (b) may invalidate a movement of the cursor on the screen for a predetermined time when the present position of the cursor moves within the specific region. In this case, the moving cursor stops for an instant when the cursor enters the specific region on the screen. Hence, the cursor can be positioned with ease when clicking or dragging a window frame, small buttons and the like on the screen.

In the cursor control method, the step (b) may control a moving quantity of the cursor on the screen based on a distance between the present position of the cursor and the specific region. In addition, the step (b) may reduce the moving quantity of the cursor on the screen when the distance increases, and/or, the step (b) may increase the moving quantity of the cursor on the screen when the distance decreases. In these cases, it is possible to quickly position the moving cursor to a target position on the screen, such as the window frame and the small buttons on the screen, by increasing the cursor moving speed as the cursor approaches the specific region. In addition, it is possible to prevent the cursor from overrunning the target position, by reducing the cursor moving speed when the cursor passes the specific region.

In the cursor control method, the specific region may include at least a first specific region and a second specific region, and the step (b) may invalidate a movement of the cursor on the screen for a predetermined time when the present position of the cursor is within the first specific region, and control the moving quantity of the cursor on the screen based on the distance between the present position of the cursor and the second specific region. In this case, it is possible to control the cursor with a high flexibility, by changing the cursor control method depending on the kind of the specific region on the screen.

Another object of the present invention is to provide a computer-readable recording medium which stores a program for causing a computer to control a position of a cursor displayed on a screen based on an input from a pointing device, comprising detecting means for causing the computer to detect a present position of the cursor on the screen based the input from the pointing device, and control means for causing the computer to control a moving quantity of the cursor on the screen based on the input from the pointing device depending on mask information which indicates a specific region on the screen and the present position of the cursor.

According to the computer-readable recording medium of the present invention, it is possible to quickly and accurately move the position of the cursor on the screen by operating the pointing device.

Still another object of the present invention is to provide an information processing apparatus having a function of displaying a cursor on a screen based on an input from a pointing device, comprising a detecting part detecting a present position of the cursor on the screen based on the input from the pointing device, and a control part controlling a moving quantity of the cursor on the screen based on the input from the pointing device depending on mask information which indicates a specific region on the screen and the present position of the cursor. According to the information processing apparatus of the present invention, it is possible to quickly and accurately move the position of the cursor on the screen by operating the pointing device.

Other objects and further features of the present invention will be apparent from the following detailed description when read in conjunction with the accompanying drawings.

BRIEF DESCRIPTION OF THE DRAWINGS

FIG. 5 is a functional block diagram of the CPU in the first embodiment of the information processing apparatus in more detail;

DESCRIPTION OF THE PREFERRED EMBODIMENTS

Figure 1:
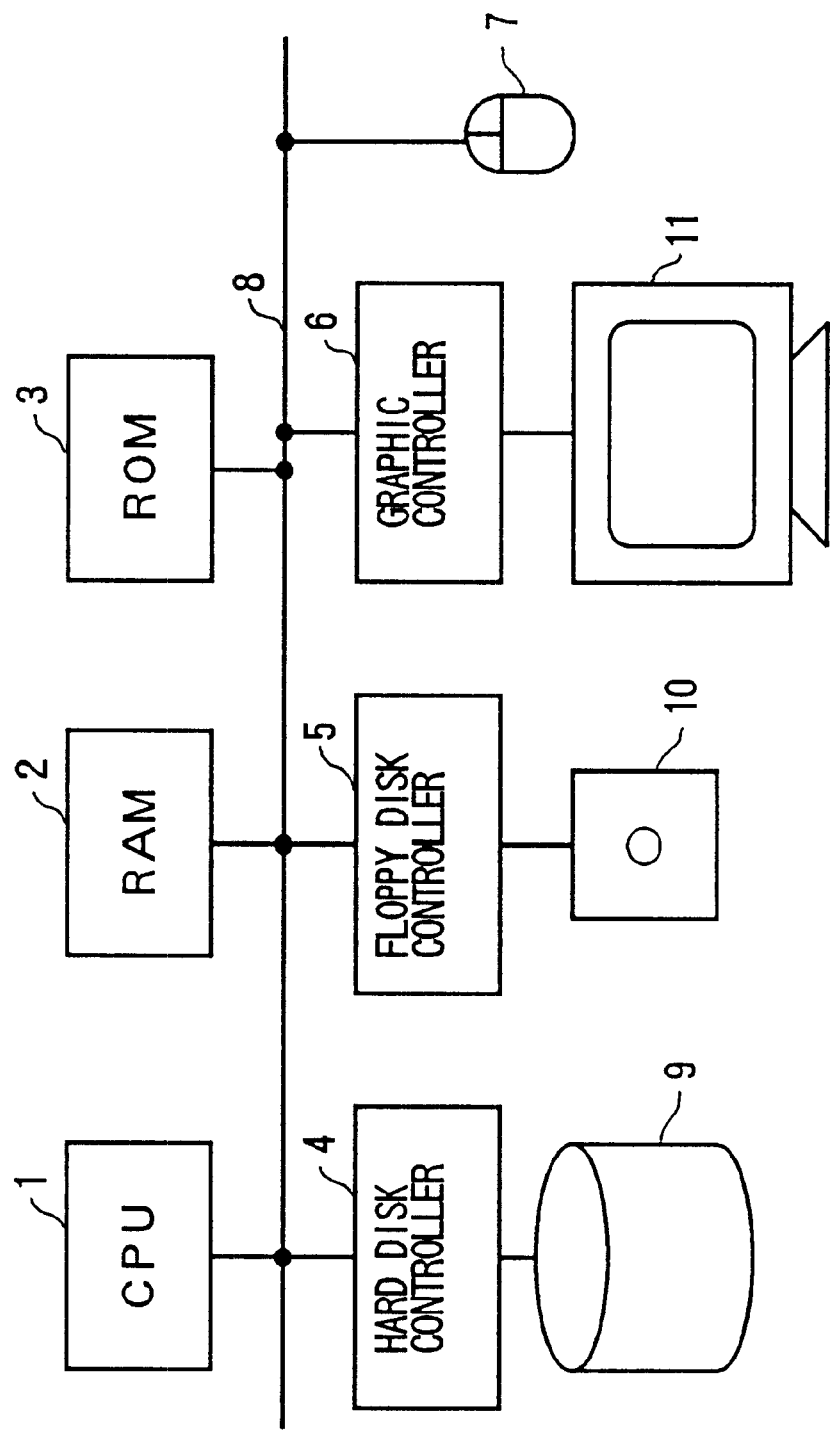
FIG. 1 is a diagram showing an embodiment of the basic construction of an information processing apparatus according to the present invention.

FIG. 1 is a diagram showing an embodiment of the basic construction of an information processing apparatus according to the present invention. In FIG. 1, an information processing apparatus, such as a personal computer, generally includes a central processing unit (CPU) 1, a RAM 2, a ROM 3, a hard disk controller 4, a floppy disk controller 5, a graphic controller 6 and a pointing device 7 which are coupled via a bus 8, a hard disk unit 9, a floppy disk unit 10, and a display unit 11. For the sake of convenience, it is assumed that the pointing device 7 is a mouse. However, the pointing device 7 may be coupled to the information processing apparatus or, may be provided on a keyboard or the like of the information processing apparatus. In FIG. 1, the illustration of the keyboard is omitted.

The CPU 1 is provided to control the operation of the entire information processing apparatus. The ROM 3 stores programs to be executed by the CPU 1, data and the like. The RAM 2 stores intermediate data of computation processes carried out by the CPU 1 and the like. The hard disk controller 4 has a known construction for controlling the hard disk unit 9 under the control of the CPU 1, and controlling writing of data to and reading of data from a hard disk (not shown) within the hard disk unit 9. The floppy disk controller 5 has a known construction for controlling the floppy disk unit 10 under the control of the CPU 1, and controlling writing of data to and reading of data from a floppy disk (not shown) within the floppy disk unit 10. The program to be executed by the CPU 1 may be stored in a hard disk or a floppy disk. The graphic controller 6 has a known construction for controlling a display on a screen of the display unit 11 based on an input from the pointing device 7 or the keyboard, under the control of the CPU 1.

Of course, the basic construction of the information processing apparatus is not limited to the basic construction shown in FIG. 1, and various known basic constructions may be used for the information processing apparatus.

Figure 2:
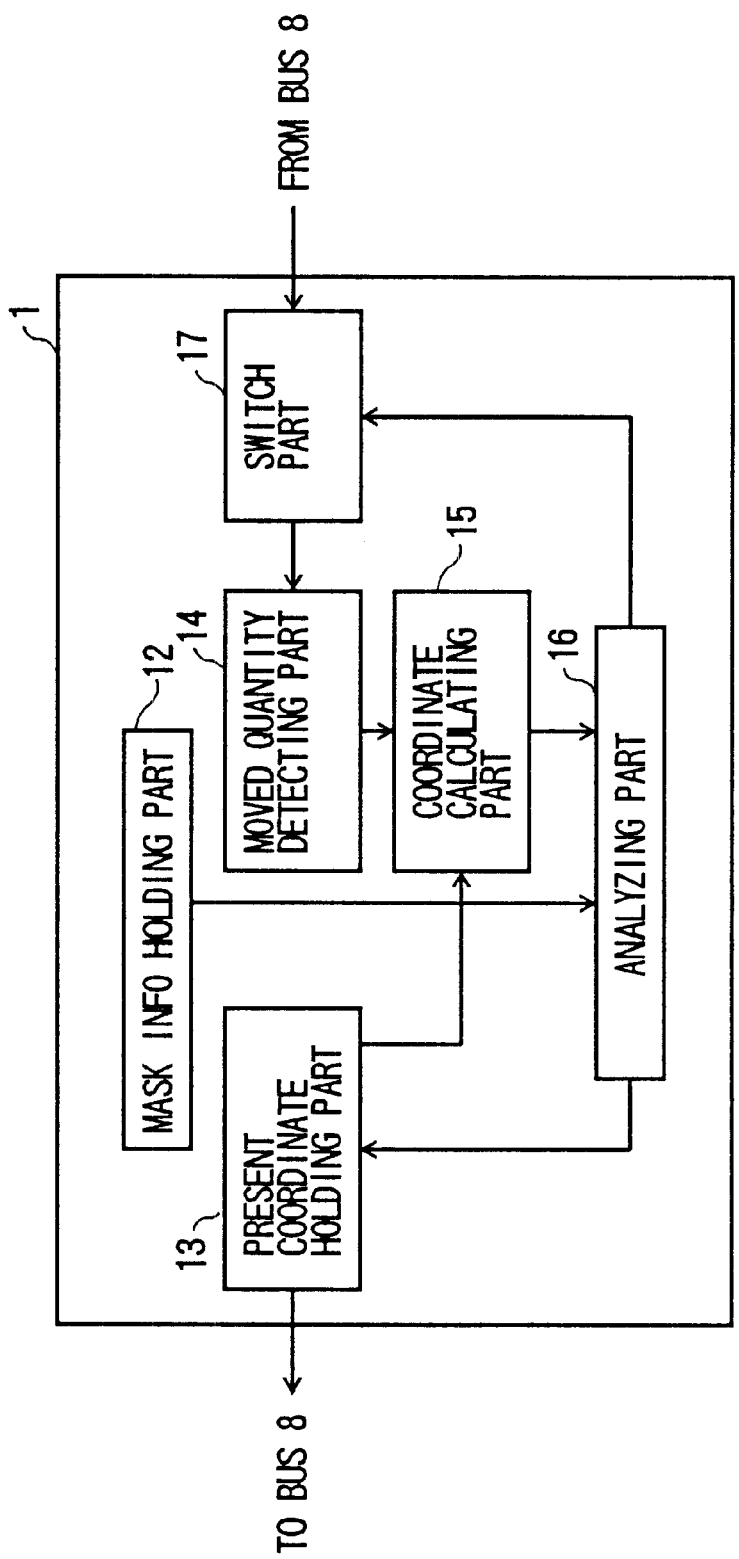
FIG. 2 is a functional block diagram of a CPU in a first embodiment of the information processing apparatus according to the present invention.

FIG. 2 is a functional block diagram showing the basic functions of the CPU 1 in a first embodiment of the information processing apparatus according to the present invention. This first embodiment of the information processing apparatus employs a first embodiment of a cursor control method according to the present invention.

In FIG. 2, the CPU 1 generally includes a mask information holding part 12, a present coordinate holding part 13, a moved quantity detecting part 14, a coordinate calculating part 15, an analyzing part 16 and a switch part 17. The mask information holding part 12 holds mask information which indicates a specific region on the screen of the display unit 11. The present coordinate holding part 13 holds a coordinate of a present position of the cursor. The coordinate of the present position of the cursor (hereinafter referred to as a present coordinate of the cursor) held in the present coordinate holding part 13 is supplied to the display unit 11 via the bus 8 and the graphic controller 6, and the cursor is displayed at a corresponding position on the screen. The moved quantity detecting part 14 detects a moved quantity of the cursor on the screen, based on the input from the pointing device 7. The coordinate calculating part 15 calculates a coordinate of a new position of the cursor on the screen, based on the moved quantity detected by the moved quantity detecting part 14 and the present coordinate held in the present coordinate holding part 13. The analyzing part 16 carries out an analysis based on the mask information held in the mask information holding part 12, the present coordinate held in the present coordinate holding part 13 and the coordinate of the new position of the cursor on the screen calculated by the coordinate calculating part 15.

More particularly, the analyzing part 16 compares the coordinate of the new position of the cursor in the present coordinate holding part 13 and the coordinate of the position of the cursor newly calculated by the coordinate calculating part 15. If the coordinate of the position of the cursor newly calculated by the coordinate calculating part 15 is outside the specific region on the screen indicated by the mask information which is held in the mask information holding part 12, the analyzing part 16 sends the coordinate of the position of the cursor newly calculated by the coordinate calculating part 15 to the present coordinate holding part 13 and replaces the value held in the present coordinate holding part 13 with the coordinate of the position of the cursor newly calculated by the coordinate calculating part 15. In addition, if both the coordinate of the position of the cursor newly calculated by the coordinate calculating part 15 and the coordinate of the new position of the cursor in the present coordinate holding part 13 are within the specific region on the screen indicated by the mask information which is held in the mask information holding part 12, the analyzing part 16 sends the coordinate of the position of the cursor newly calculated by the coordinate calculating part 15 to the present coordinate holding part 13 and replaces the value held in the present coordinate holding part 13 with the coordinate of the position of the cursor newly calculated by the coordinate calculating part 15. Furthermore, if the coordinate of the position of the cursor newly calculated by the coordinate calculating part 15 is within the specific region on the screen indicated by the mask information which is held in the mask information holding part 12 and the coordinate of the new position of the cursor in the present coordinate holding part 13 is outside the specific region on the screen indicated by the mask information which is held in the mask information holding part 12, the analyzing part 16 supplies the switch part 17 with a control signal which invalidates for a predetermined time the input from the pointing device 7, that is, a motion signal. As a result, the switch part 17 which is supplied with the motion signal from the pointing device 7 via the bus 8 carries out a switching operation in response to the control signal, and blocks the motion signal for the predetermined time so that the motion signal is not supplied to the moved quantity detecting part 14 for this predetermined time.

Figure 3:
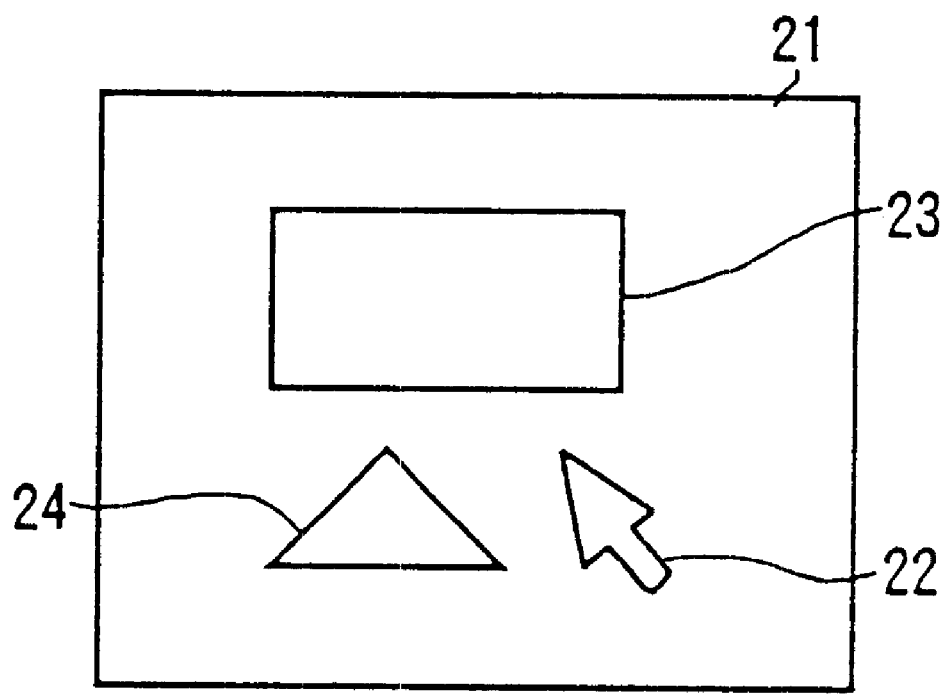
FIG. 3 is a diagram showing specific regions and a cursor on a screen.

Accordingly, in a case where specific regions 23 and 24 are provided on a screen 21 as shown in FIG. 3, for example, a cursor 22 stops for the predetermined time if the cursor 22 moves and overlaps the specific region 23 or 24. For this reason, the user can easily position the cursor when dragging or clicking a window frame, a small button and the like on the screen 21 by the pointing device 7.

Of course, the number of specific regions on the screen is not limited to two, and may be one or, three or more.

In this embodiment, the mask information holding part 12 and the present coordinate holding part 13 are formed by an internal memory of the CPU 1. However, the functions of the mask information holding part 12 and the present coordinate holding part 13 may be realized by the ROM 3 and the RAM 2.

Figure 4:
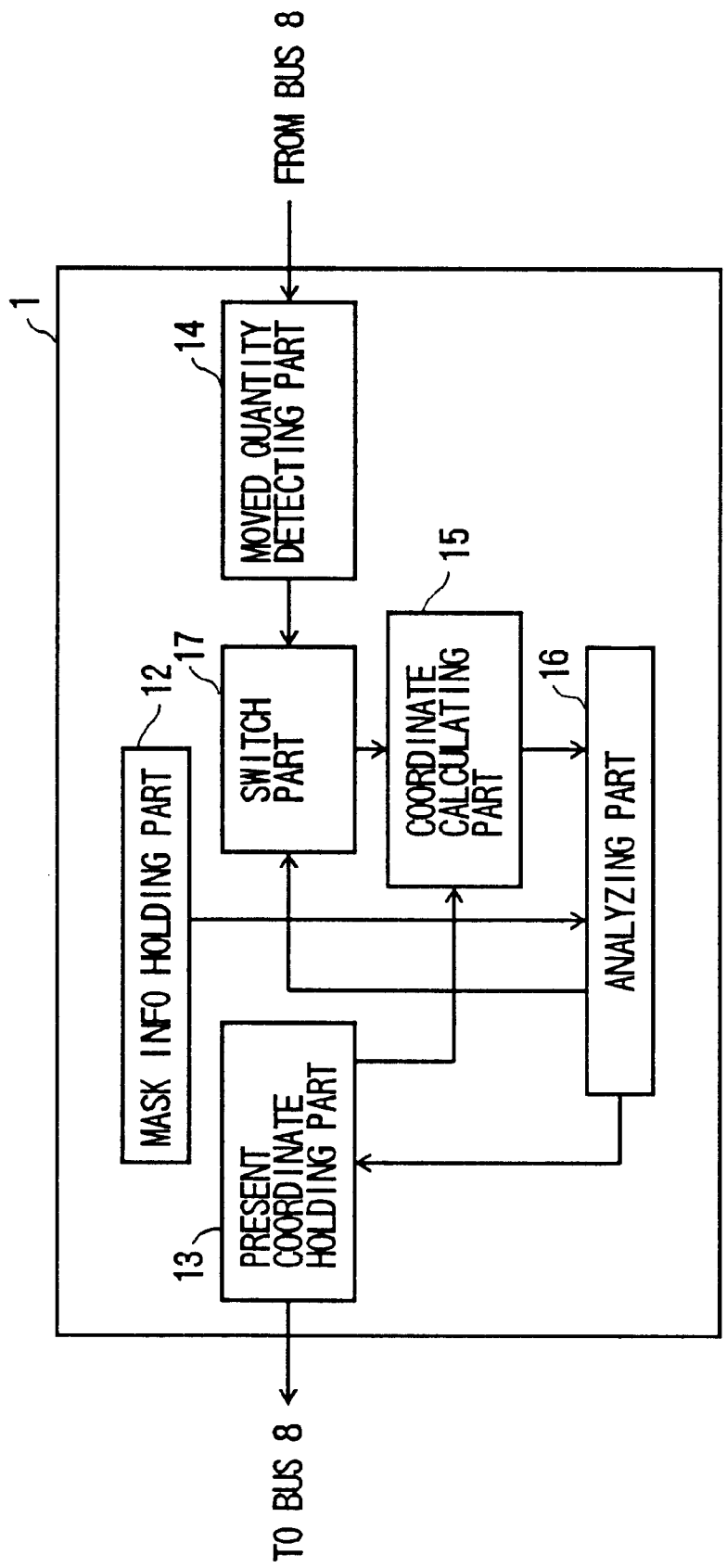
FIG. 4 is a functional block diagram of a CPU in a modification of the first embodiment of the information processing apparatus.

Moreover, as a modification of the first embodiment of the information processing apparatus, the switch part 17 may be provided at a stage subsequent to the moved quantity detecting part 14, as shown in FIG. 4. In FIG. 4, those parts which are the same as those corresponding parts in FIG. 2 are designated by the same reference numerals, and a description thereof will be omitted.

FIG. 5 is a functional block diagram of the CPU 1 in the first embodiment of the information processing apparatus, showing the functions in more detail. In FIG. 5, the CPU 1 generally includes a bit map memory 22, registers 23-1 and 23-2, a motion pulse detector 24, a x-coordinate calculating part 25-1, a y-coordinate calculating part 25-2, a firmware 26 and a switch 27.

The bit map memory 22 corresponds to the mask information holding part 12, and holds the mask information in a bit map format. The registers 23-1 and 23-2 correspond to the present coordinate holding part 13, and hold a present coordinate (x0, y0). The motion pulse detector 24 corresponds to the moved quantity detecting part 14, and detects a moved quantity ($\Delta x$, $\Delta y$) by counting the motion signal in the pulse form which is output when the pointing device 7 is operated and moved. The x-coordinate calculating part 25-1 and the y-coordinate calculating part 25-2 correspond to the coordinate calculating part 15, and calculates a coordinate (x1, y1) of the new position of the cursor, based on the moved quantity ($\Delta x$, $\Delta y$) detected by the motion pulse detector 24 and the present coordinate (x0, y0) held in the registers 23-1 and 23-2.

The firmware 26 corresponds to the analyzing part 16, and carries out an analysis based on the mask information from the bit map memory 22, the present coordinate (x0, y0) held in the registers 23-1 and 23-2, and the coordinate (x1, y1) of the new position of the cursor calculated by the x-coordinate calculating part 25-1 and the y-coordinate calculating part 25-2.

More particularly, if the coordinate (x1, y1) of the new position of the cursor calculated by the x-coordinate calculating part 25-1 and the y-coordinate calculating part 25-2 is outside a specific region on the screen indicated by the mask information from the bit map memory 22, the firmware 26 puts this coordinate (x1, y1) of this new position of the cursor into the registers 23-1 and 23-2. In addition, if both the coordinate (x1, y1) of the new position of the cursor calculated by the x-coordinate calculating part 25-1 and the y-coordinate calculating part 25-2 and the present coordinate (x0, y0) held in the registers 23-1 and 23-2 are within the specific region on the screen indicated by the mask information from the bit map memory 22, the firmware 26 puts the coordinate (x1, y1) of this new position of the cursor into the registers 23-1 and 23-2. Furthermore, if the coordinate (x1, y1) of the new position of the cursor calculated by the x-coordinate calculating part 25-1 and the y-coordinate calculating part 25-2 is within the specific region on the screen indicated by the mask information from the bit map memory 22, and the present coordinate (x0, y0) held in the registers 23-1 and 23-2 is outside the specific region on the screen indicated by the mask information from the bit map memory 22, the firmware 26 supplies the switch 27 with a control signal which invalidates for a predetermined time the input from the pointing device 7, that is, the motion signal in the pulse form. As a result, the switch 27 which is supplied with the motion signal from the pointing device 7 via the bus 8 carries out a switching operation in response to the control signal, and blocks the motion signal for the predetermined time so that the motion signal is not supplied to the motion pulse detector 24 for this predetermined time.

As described above in conjunction with FIG. 4, it is of course possible to provide the switch 27 in a stage subsequent to the motion pulse detector 24.

Figure 6:
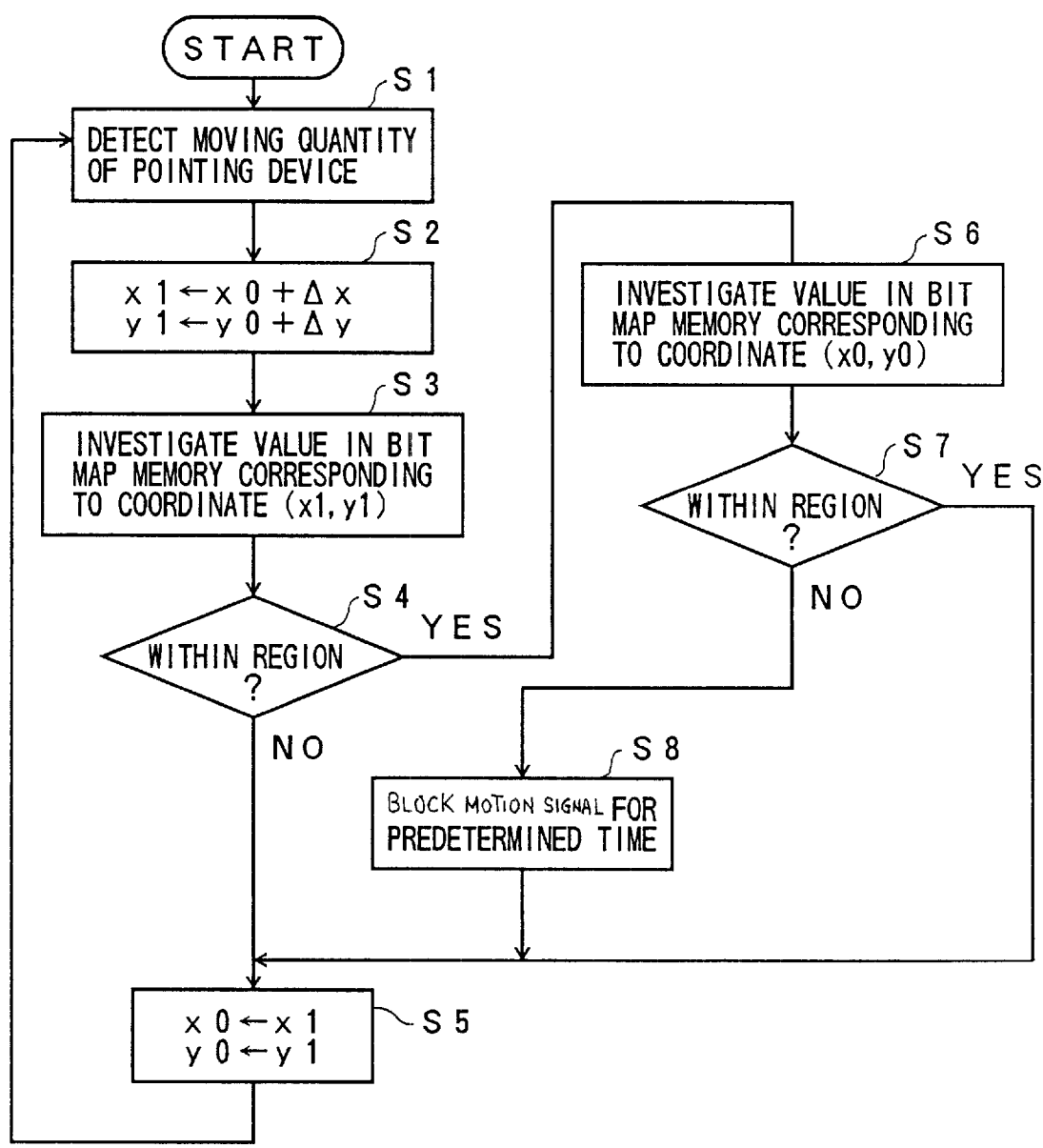
FIG. 6 is a flow chart for explaining the operation of the CPU shown in FIG. 5.

FIG. 6 is a flow chart for explaining the operation of the CPU 1 shown in FIG. 5. In FIG. 6, a step S1 detects the moved quantity ($\Delta x$, $\Delta y$) by the motion pulse detector 24 based on the motion signal which is output when the pointing device 7 is operated and moved. A step S2 calculates the coordinate (x1, y1) of the new position of the cursor by the x-coordinate calculating part 25-1 and the y-coordinate calculating part 25-2, based on the detected moved quantity ($\Delta x$, $\Delta y$) and the present coordinate (x0, y0) held in the registers 23-1 and 23-2. A step S3 investigates by the firmware 26 whether or not the coordinate (x1, y1) of the new position of the cursor calculated by the x-coordinate calculating part 25-1 and the y-coordinate calculating part 25-2 is within the specific region on the screen indicated by the mask information from the bit map memory 22, and the process advances to a step S4.

The step S4 decides by the firmware 26 whether or not the coordinate (x1, y1) of the new position of the cursor is within the specific region on the screen indicated by the mask information. If the decision result in the step S4 is NO, a step S5 puts the coordinate (x1, y1) of this new position of the cursor into the registers 23-1 and 23-2. On the other hand, if the decision result in the step S4 is YES, a step S6 investigates by the firmware 26 whether or not the present coordinate (x0, y0) held in the registers 23-1 and 23-2 is within the specific region on the screen indicated by the mask information from the bit map memory 22, and the process advances to a step S7.

The step S7 decides by the firmware 26 whether or not the present coordinate (x0, y0) held in the registers 23-1 and 23-2 is within the specific region on the screen indicated by the mask information from the bit map memory 22. If the decision result in the step S7 is YES, the process advances to the step S5. On the other hand, the process advances to a step S8 if the decision result in the step S7 is NO.

The step S8 is carried out when the coordinate (x1, y1) of the new position of the cursor on the screen calculated by the x-coordinate calculating part 25-1 and the y-coordinate calculating part 25-2 is within the specific region on the screen indicated by the mask information from the bit map memory 22, and the present coordinate (x0, y0) held in the registers 23-1 and 23-2 is outside the specific region on the screen indicated by the mask information from the bit map memory 22. For this reason, the step S8 supplies the switch 27 by the firmware 26 with the control signal which invalidates the motion signal having the pulse form, that is, the input from the pointing device 7, for the predetermined time. Hence, the switch 27 which receives the motion signal from the pointing device 7 via the bus 8 carries out a switching operation to block the motion signal for the predetermined time in response to the control signal, so that the motion signal is not supplied to the motion pulse detector 24 for the predetermined time. After the step S8, the step S5 puts, by the firmware 26, the coordinate (x1, y1) of the new position of the cursor into the registers 23-1 and 23-2, and the process returns to the step S1.

Figure 7:
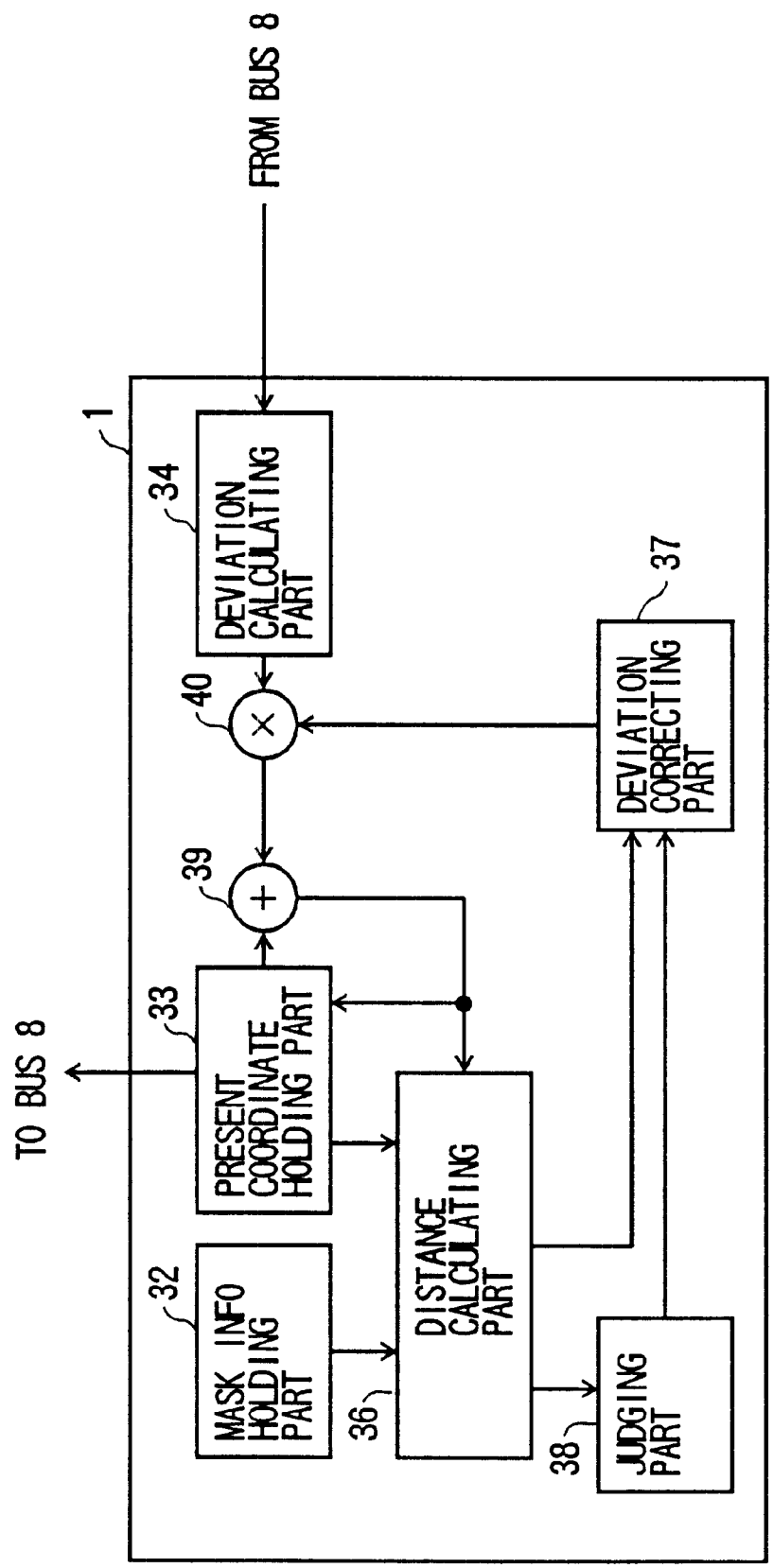
FIG. 7 is a functional block diagram of a PU in a second embodiment of the information processing apparatus according to the present invention.

FIG. 7 is a functional block diagram of the CPU 1 in a second embodiment of the information processing apparatus according to the present invention. This second embodiment of the information processing apparatus employs a second embodiment of the cursor control method according to the present invention.

In FIG. 7, the CPU 1 generally includes a mask information holding part 32, a present coordinate holding part 33, a deviation calculating part 34, a distance calculating part 36, a deviation correcting part 37, a judging part 38, an adding part 39 and a multiplying part 40. The mask information holding part 32 holds mask information which indicates a specific region on the screen. The present coordinate holding part 33 holds a coordinate of the present position of the cursor. The coordinate of the present position of the cursor held in the present coordinate holding part 33 is supplied to the display unit 11 via the bus 8 and the graphic controller 6, and the cursor is displayed at a corresponding position on the screen. The deviation calculating part 34 calculates the moved quantity of the cursor on the screen as deviation information, based on the input from the pointing device 7.

The distance calculating part 36 calculates a distance between the specific region which is indicated by the mask information held in the mask information holding part 32 and the coordinate of the present position of the cursor held in the present coordinate holding part 33. The judging part 38 backs up the distance calculated by the distance calculating part 36 every time the distance calculating part 36 makes the calculation, and outputs distance change information based on a previously calculated distance and a present calculated distance. This distance change information indicates whether the distance has an increasing tendency or a decreasing tendency. The deviation correcting part 37 obtains a coefficient a calculated by the distance calculating part 36 and the distance change information output from the judging part 38, and supplies this coefficient a to the multiplying part 40. This coefficient a is set to $\alpha=1$ if the distance calculated by the distance calculating part 36 is greater than a predetermined value. On the other hand, if the distance calculated by the distance calculating part 36 is less than or equal to the predetermined value, the coefficient $\alpha$ is set to $\alpha>1$ when the calculated distance has the decreasing tendency and is set to $0<\alpha<1$ when the calculated distance has the increasing tendency.

The multiplying part 40 multiplies the coefficient $\alpha$ and the deviation information from the deviation calculating part 34, and supplies a result of this multiplication to the adding part 39. The adding part 39 adds the multiplied result (deviation information multiplied by the coefficient $\alpha$) and the coordinate of the present position of the cursor held in the present coordinate holding part 33, and supplies a result of this addition to the distance calculating part 36 and the present coordinate holding part 33.

Figure 8:
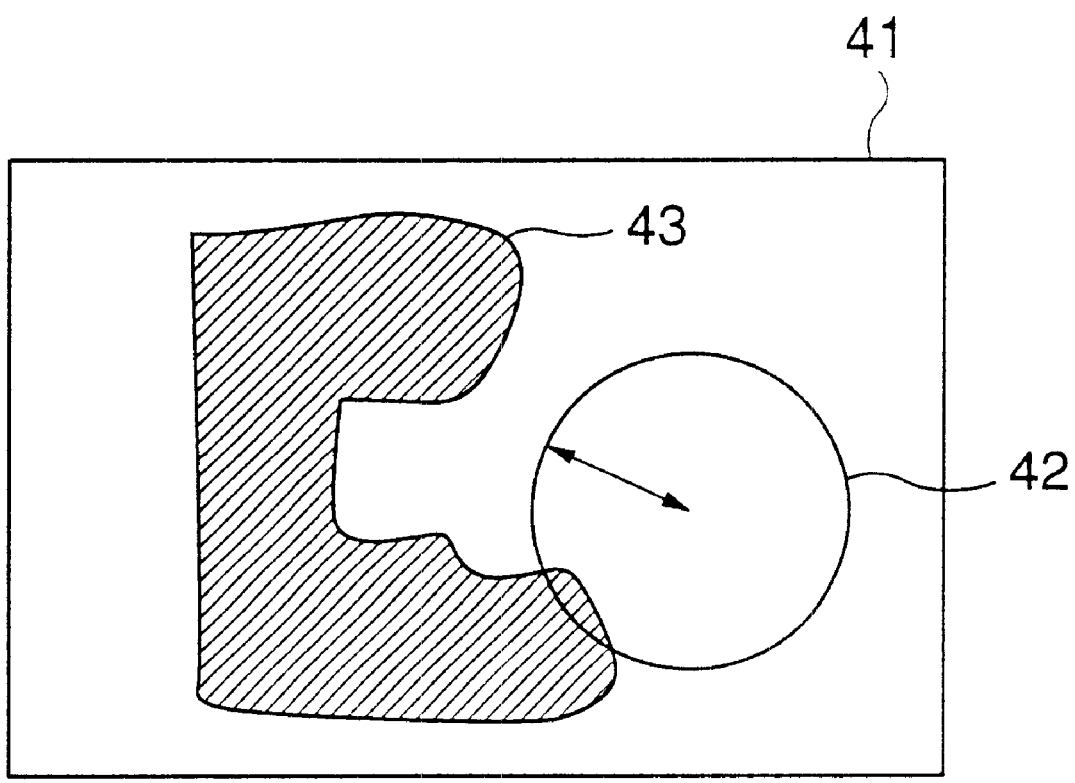
FIG. 8 is a diagram for explaining a distance calculating operation of a distance calculating part.

FIG. 8 is a diagram for explaining a distance calculating operation of the distance calculating part 36. In FIG. 8, in a case where a specific region 43 is provided on a screen 41, for example, the distance calculating part 36 decides whether or not a circle 42 having a radius r about the present coordinate of the cursor overlaps the specific region 43. When it is assumed that the radius r takes values of natural numbers 1, 2, 3, ... in arbitrary units, it is first investigated whether or not the circle 42 overlaps the specific region 43 when r=1. If the circle 42 does not overlap the specific region 43 when r=1, the radius r is set to r=2. Similarly thereafter, the radius r is successively incremented if the circle 42 does not overlap the specific region 43 with the given value of the radius r. The value of the radius r which makes the circle 42 overlap the specific region 43 is used as the distance between the specific region 43 which is indicated by the mask information held in the mask information holding part 32 and the coordinate of the present position of the cursor held in the present coordinate holding part 33.

Accordingly, as the cursor approaches the specific region on the screen, the moving speed of the cursor increases, thereby making it possible to quickly move the cursor to a target position such as a position on a window frame and a small button on the screen. In addition, when the cursor passes the specific region, the moving speed of the cursor decreases, thereby making it possible to prevent the cursor from inconveniently overrunning the target position such as the position of the window frame and the small button on the screen. Therefore, this embodiment is particularly effective when applied to a pointing device such as a joy-stick and a trackball having an ease of operation which in general is poor compared to the ease of operation of a mouse.

Of course, the number of specific regions on the screen is not limited to one, and may be two or more.

In this embodiment, the mask information holding part 32 and the present coordinate holding part 33 are formed by the internal memory of the CPU 1. However, the functions of the mask information holding part 32 and the present coordinate holding part 33 may of course be realized by the ROM 3 and the RAM 2.

Figure 9:
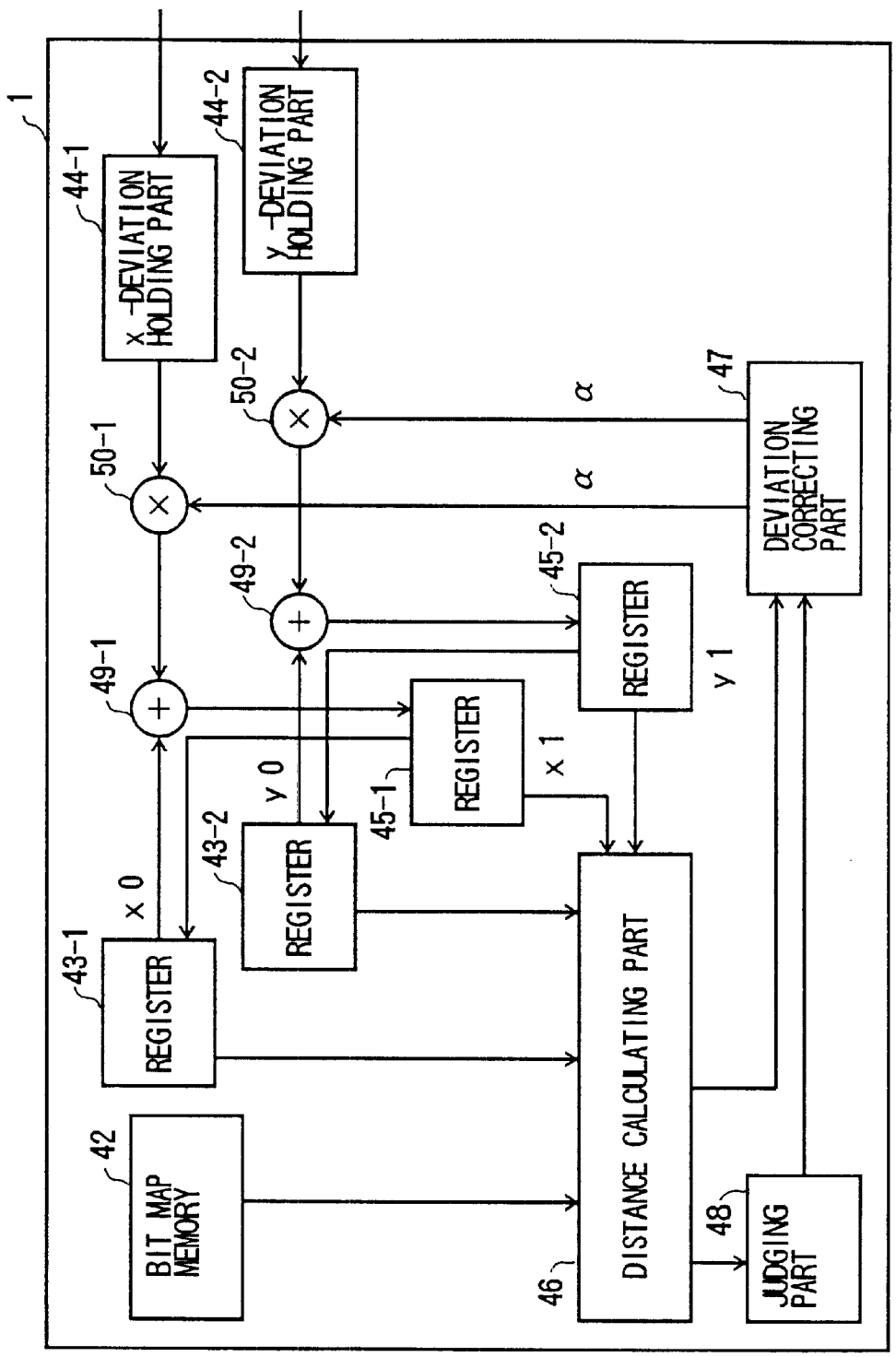
FIG. 9 is a functional block diagram of the CPU in the second embodiment of the information processing apparatus in more detail.

FIG. 9 is a functional block diagram of the CPU 1 in the second embodiment of the information processing apparatus showing the functions in more detail. In FIG. 9, the CPU 1 generally includes a bit map memory 42, registers 43-1, 43-2, 45-1 and 45-2, a x-deviation calculating part 44-1, a y-deviation calculating part 44-2, a distance calculating part 46, a deviation correcting part 47, a judging part 48, adders 49-1 and 49-2, and multipliers 50-1 and 50-2.

The bit map memory 42 corresponds to the mask information holding part 22, and holds the mask information in the bit map format. The registers 43-1 and 43-2 correspond to the present coordinate holding part 33, and holds the coordinate (x0, y0) of the present position of the cursor. The x-deviation calculating part 44-1 and the y-deviation calculating part 44-2 correspond to the deviation calculating part 34, and calculates, as the deviation information, a x-deviation quantity $\Delta x$ and a y-deviation quantity $\Delta y$ of the cursor on the screen, based on the input from the pointing device 7. The coordinate (x0, y0) of the present position of the cursor held in the registers 43-1 and 43-2 is updated based on the deviation information calculated by the x-deviation calculating part 44-1 and the y-deviation calculating part 44-2 and the coordinate (x0, y0) of the present position of the cursor held in the registers 43-1 and 43-2.

The distance calculating part 46 corresponds to the distance calculating part 36, and calculates a distance d0 between the specific region which is indicated by the mask information held in the bit map memory 42 and the coordinate (x0, y0) of the present position of the cursor held in the registers 43-1 and 43-2. The judging part 48 corresponds to the judging part 38, and backs up the distance d0 every time the distance d0 is calculated by the distance calculating part 46. This judging part 48 outputs distance change information which indicates whether the distance d0 has an increasing tendency or a decreasing tendency, based on a previously calculated distance d0 and the presently calculated distance d0. The deviation correcting part 47 corresponds to the deviation correcting part 37, and supplies the coefficient $\alpha$ to the multipliers 50-1 and 50-2 by obtaining the coefficient $\alpha$ based on the distance d0 calculated by the distance calculating part 46 and the distance change information output from the judging part 48. This coefficient $\alpha$ is set to $\alpha 1$ if the distance d0 calculated by the distance calculating part 46 is greater than a predetermined value D. On the other hand, if the distance d0 calculated by the distance calculating part 46 is less than or equal to the predetermined value D, the coefficient $\alpha$ is set to $\alpha > 1$ when the calculated distance d0 has the decreasing tendency and is set to $0 < \alpha < 1$ when the calculated distance d0 has the increasing tendency.

The multiplier 50-1 multiplies the coefficient $\alpha$ obtained from the deviation correcting part 47 to the x-deviation quantity $\Delta x$ obtained from the x-deviation calculating part 44-1, and supplies a result of this multiplication to the adder 49-1. The adder 49-1 adds the multiplied result (x-deviation quantity $\Delta x$ multiplied by the coefficient $\alpha$) and the x-coordinate x0 of the present position of the cursor held in the register 43-1, and temporarily holds an added result x1 in the register 45-1. The added result x1 held in the register 45-1 updates the x-coordinate x0 of the present position of the cursor held in the register 43-1, and is supplied to the distance calculating part 46.

Similarly, the multiplier 50-2 multiplies the coefficient $\alpha$ obtained from the deviation correcting part 47 to the y-deviation quantity $\Delta y$ obtained from the y-deviation calculating part 44-2, and supplies a result of this multiplication to the adder 49-2. The adder 49-2 adds the multiplied result (y-deviation quantity $\Delta y$ multiplied by the coefficient $\alpha$) and the y-coordinate y0 of the present position of the cursor held in the register 43-2, and temporarily holds an added result y1 in the register 45-2. The added result y1 held in the register 45-2 updates the y-coordinate y0 of the present position of the cursor held in the register 43-2, and is supplied to the distance calculating part 46.

Therefore, the registers 45-1 and 45-2 also correspond to the present coordinate holding part 33.

Figure 10:
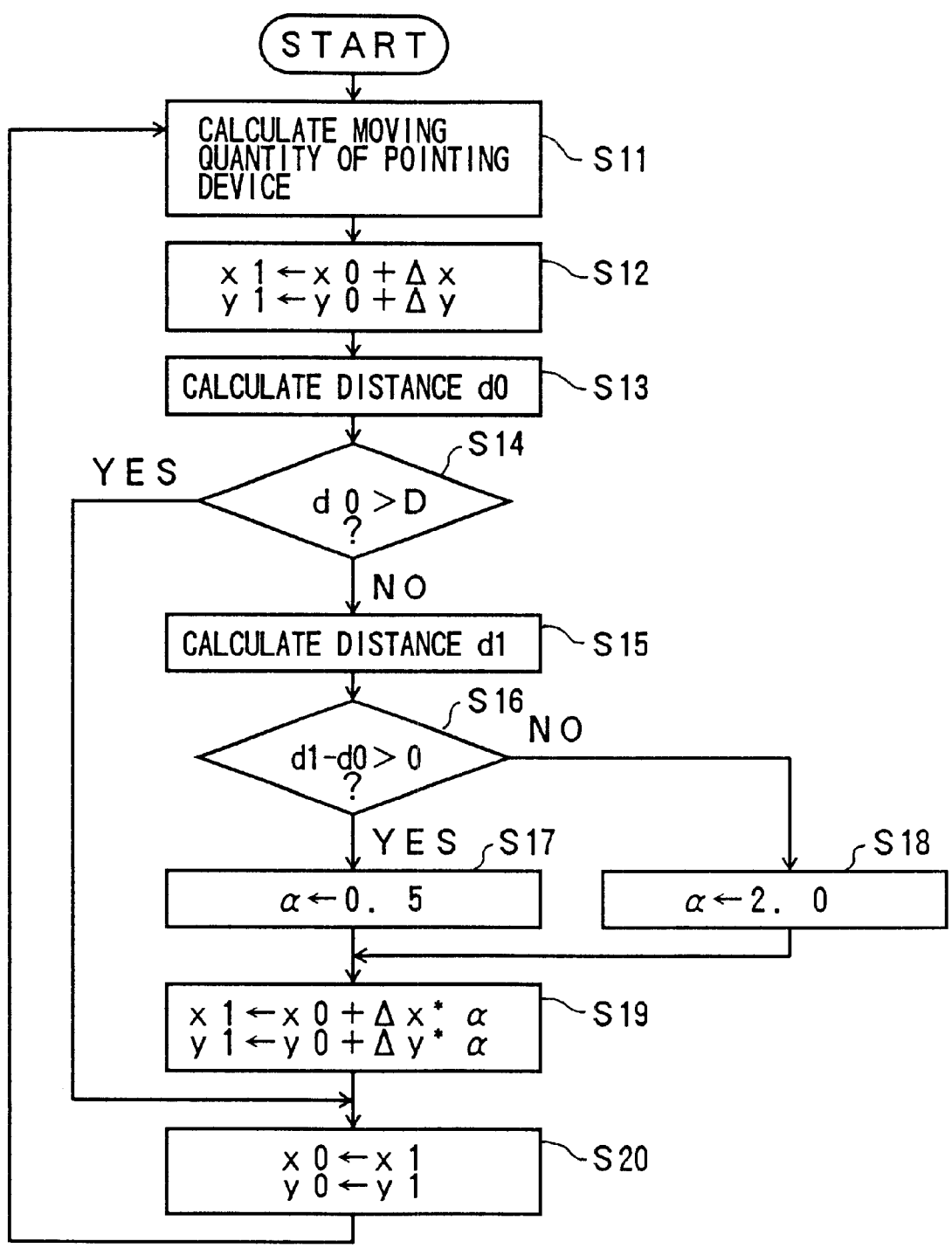
FIG. 10 is a flow chart for explaining the operation the CPU shown in FIG. 9.

FIG. 10 is a flow chart for explaining the operation of the CPU 1 shown in FIG. 9. In FIG. 10, a step S11 calculates a moved quantity ($\Delta x$, $\Delta y$) by the x-deviation calculating part 44-1 and the y-deviation calculating part 44-2, based on the motion signal which is output when the pointing device 7 is operated and moved. A step S12 adds, by the adders 49-1 and 49-2, the calculated moved quantity ($\Delta x$, $\Delta y$) to the present coordinate (x0, y0) held in the registers 43-1 and 43-2, so as to calculate the coordinate (x1, y1) of the new position of the cursor and hold this coordinate (x1, y1) in the registers 45-1 and 45-2. A step S13 calculates by the distance calculating part 46 the distance d0 between the present coordinate (x0, y0) held in the registers 43-1 and 43-2 and the specific region on the screen indicated by the mask information from the bit map memory 42. A step S14 decides whether or not the distance d0 calculated by the distance calculating part 46 is greater than the predetermined value D. If the decision result in the step S14 is YES, the process advances to a step S20 wherein the coordinate (x1, y1) of the new position of the cursor is held in the registers 43-1 and 43-2 and updated as the present coordinate (x0, y0), and the process then returns to the step S11.

On the other hand, if the decision result in the step S14 is NO, the process advances to a step S15. The step S15 calculates by the distance calculating part 46 the distance d1 between the coordinate (x1, y1) of the new position of the cursor held in the registers 45-1 and 45-2 and the specific region on the screen indicated by the mask information from the bit map memory 42. In other words, the distance d1 is calculated if the cursor is located at a position which is close to a certain extent to the specific region on the screen. A step S16 decides, by the judging part 48, whether or not d1−d0>0, so as to judge whether the cursor is moving away from the specific region or is approaching the specific region.

If the cursor is moving away from the specific region and the decision result in the step S16 is YES, a step S17 sets the coefficient $\alpha$ by the deviation correcting part 47 to 0.5, for example, and the process advances to a step S19 which will be described later. On the other hand, if the cursor is approaching the specific region and the decision result in the step S16 is NO, a step S18 sets the coefficient a by the deviation correcting part 47 to 2.0, for example, and the process advances to the step S19.

The step S19 calculates, by the multipliers 50-1 and 50-2 and the adders 49-1 and 49-2, the coordinate (x1, y1) of the new position of the cursor based on the moved quantity ($\Delta x$, $\Delta y$) from the x-deviation calculating part 44-1 and the y-deviation calculating part 44-2, the present coordinate (x0, y0) from the registers 43-1 and 43-2, and the coefficient a from the deviation correcting part 47, and holds the coordinate (x1, y1) of the new position of the cursor in the registers 45-1 and 45-2. Then, the step S20 holds the coordinate (x1, y1) of the new position of the cursor held in the registers 45-1 and 45-2 in the registers 43-1 and 43-2 as the present coordinate (x0, y0), and updates the present coordinate (x0, y0). After the step S20, the process returns to the step S11.

The first and second embodiments described above may be appropriately combined, as in the case of a third embodiment of the information processing apparatus according to the present invention which will be described hereunder.

Figure 11:
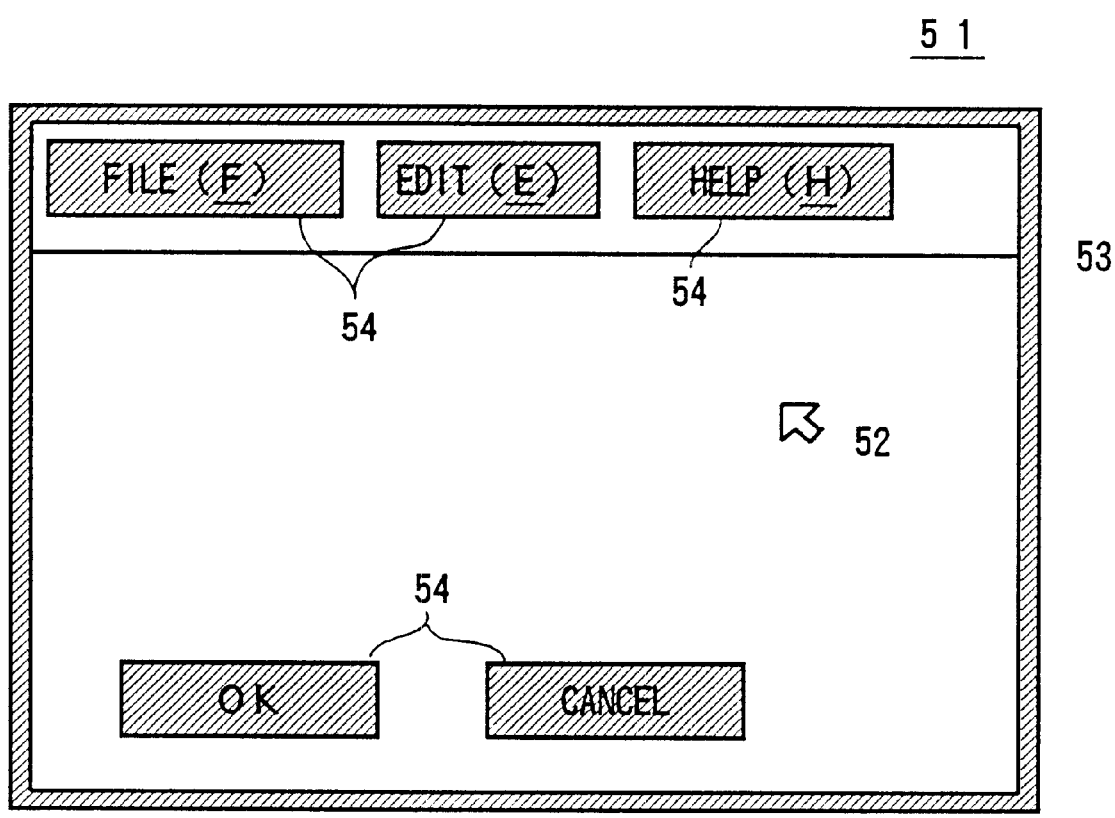
FIG. 11 is a diagram for explaining a third embodiment of the information processing apparatus according to the present invention.

FIG. 11 is a diagram for explaining the operation of the third embodiment of the information processing apparatus. This third embodiment of the information processing apparatus employs a third embodiment of the cursor control method according to the present invention.

In FIG. 11, a first specific region 53 corresponding to a window frame, second specific regions 54 corresponding to small buttons such as "FILE (F)", "EDIT (E)", "HELP (H)", "OK" and "CANCEL" are set on a screen 51. When a cursor 52 is moved, the cursor control with respect to the first specific region 53 is carried out according to the first embodiment described above in conjunction with FIG. 6, for example. On the other hand, when the cursor is moved, the cursor control with respect to the second specific regions 54 is carried out according to the second embodiment described above in conjunction with FIG. 10, for example. By carrying out the cursor control by different methods depending on the kinds of the specific regions on the screen 51, it is possible to realize a highly flexible cursor control to suit the needs, and the operation ease of the pointing device can further be improved.

Next, a description will be given of an embodiment of a computer-readable recording medium according to the present invention. In this embodiment of the computer-readable recording medium, a program for causing the CPU 1 to carry out an operation according to any one of the first through third embodiments described above is stored in a recording medium such as the floppy disk 10. Of course, the recording medium is not limited to a portable or replaceable recording medium such as an integrated circuit (IC) card memory, floppy disk, magneto-optical disk, CD-ROM and various kinds of semiconductor memory devices, and includes a recording medium which is accessible by a computer which is coupled via a communication means such as a modem and a LAN. Although not illustrated in FIG. 1, such a modem is coupled to the bus 8, and the information processing apparatus is coupled to the LAN or the like via the modem.

Next, a description will be given of a method of setting the mask information which indicates the specific region on the screen.

When initializing a pointing device driver which is installed in storage such as the hard disk within the hard disk drive 9 in order to drive the pointing device 7 by the CPU 1, the CPU 1 acquires a bit map memory region having a size identical to the screen displayed on the display unit 11, and initializes this bit map memory region. For example, this bit map region is provided in the RAM 2. In the case of a screen having a size of 1024×768 dots, for example, the CPU 1 acquires as the bit map memory region a region of 1024×768×1 bits in binary value for monochrome data. The pointing device driver manages this bit map memory region for the control which is carried out thereafter.

When an application which is installed with respect to the CPU 1 displays a window on the screen, the CPU 1 sets corresponding memory regions in the RAM 2 or the like with respect to objects which are clickable by the pointing device 7, such as buttons, icons, bit maps, menu items and the like on the screen. For example, these memory regions corresponding to the clickable objects are determined when setting the screen of the application. However, in the case of an application in which a layout of the objects such as the buttons and icons on the screen change dynamically, a modification is made with respect to the mask information based on the display positions and the shapes of the objects, when displaying these objects on the screen. The mask information which is generated in this manner is written in the bit map memory region which is managed by the pointing device driver via an interface between the application and the pointing device driver.

In a case where the clickable object displayed on the screen is hidden by another window and the like, or in a case where the application changes the window size and the state of the screen changes, these changes may be notified to the pointing device driver so as to reflect the changes in the mask information.

In each of the embodiments described above, the information processing apparatus may be a desktop type information processing apparatus or a portable type information processing apparatus.

Further, the present invention is not limited to these embodiments, but various variations and modifications may be made without departing from the scope of the present invention.

What is claimed is:

1. A cursor control method controlling a position of a cursor displayed on a screen based on an input from a pointing device, comprising:

detecting a present position of the cursor based on the input from the pointing device; and controlling a moving amount of the cursor on the screen based on the input from the pointing device depending on mask information which indicates a specific region on the screen and which controls a moving amount of the cursor based on the present position of the cursor when the cursor is moved in an arbitrary direction on the screen.

2. The cursor control method as claimed in claim 1, wherein said controlling the moving amount of the cursor on the screen invalidates movement of the cursor on the screen for a predetermined time when the present position of the cursor moves within the specific region.

3. The cursor control method as claimed in claim 1, wherein said controlling the moving amount of the cursor on the screen controls a moving amount of the cursor on the screen based on a distance between the present position of the cursor and the specific region.

4. The cursor control method as claimed in claim 3, wherein said controlling the moving amount of the cursor on the screen reduces the moving amount of the cursor on the screen when the distance increases.

5. The cursor control method as claimed in claim 3, wherein said controlling the moving amount of the cursor on the screen increases the moving amount of the cursor on the screen when the distance decreases.

6. The cursor control method as claimed in claim 1, wherein the specific region includes at least a first specific region and a second specific region, and said controlling the moving amount of the cursor on the screen invalidates movement of the cursor on the screen for a predetermined time when the present position of the cursor is within the first specific region, and controls the moving amount of the cursor on the screen based on the distance between the present position of the cursor and the second specific region.

7. A computer-readable recording medium which stores a program for causing a computer to control a position of a cursor displayed on a screen based on an input from a pointing device, comprising:

detecting means for causing the computer to detect a present position of the cursor on the screen based on the input from the pointing device; and control means for causing the computer to control a moving amount of the cursor on the screen based on the input from the pointing device depending on mask information which indicates a specific region on the screen and which controls a moving amount of the cursor based on the present position of the cursor when the cursor is moved in an arbitrary direction on the screen.

8. The computer-readable recording medium as claimed in claim 7, wherein said control means causes the computer to invalidate a movement of the cursor on the screen for a predetermined time when the present position of the cursor moves within the specific region.

9. The computer-readable recording medium as claimed in claim 7, wherein said control means causes the computer to control the moving amount of the cursor on the screen based on a distance between the present position of the cursor and the specific region.

10. The computer-readable recording medium as claimed in claim 9, wherein said control means causes the computer to reduce the moving amount of the cursor on the screen when the distance increases.

11. The computer-readable recording medium as claimed in claim 9, wherein said control means causes the computer to increase the moving amount of the cursor on the screen when the distance decreases.

12. The computer-readable recording medium as claimed in claim 7, wherein the specific region includes at least a first specific region and a second specific region, and said control means causes the computer to invalidate a movement of the cursor on the screen for a predetermined time when the present position of the cursor is within the first specific region, and to control the moving amount of the cursor on the screen based on the distance between the present position of the cursor and the second specific region.

13. An information processing apparatus having a function of displaying a cursor on a screen based on an input from a pointing device, comprising:

a detecting part detecting a present position of the cursor on the screen based on the input from the pointing device; and a control part controlling a moving amount of the cursor on the screen based on the input from the pointing device depending on mask information which indicates a specific region on the screen and which controls a moving amount of the cursor based on the present position of the cursor when the cursor is moved in an arbitrary direction on the screen.

14. The information processing apparatus as claimed in claim 13, wherein said control part invalidates movement of the cursor on the screen for a predetermined time when the present position of the cursor moves within the specific region.

15. The information processing apparatus as claimed in claim 13, wherein said control part controls the moving amount of the cursor on the screen based on a distance between the present position of the cursor and the specific region.

16. The information processing apparatus as claimed in claim 15, wherein said control part reduces the moving amount of the cursor on the screen when the distance increases.

17. The information processing apparatus as claimed in claim 15, wherein said control part increases the moving amount of the cursor on the screen when the distance decreases.

18. The information processing apparatus as claimed in claim 13, wherein the specific region includes at least a first specific region and a second specific region, and said control part invalidates movement of the cursor on the screen for a predetermined time when the present position of the cursor is within the first specific region, and controls the moving amount of the cursor on the screen based on the distance between the present position of the cursor and the second specific region.

* * * * *